(12) United States Patent
Lang et al.

(10) Patent No.: US 10,885,475 B2
(45) Date of Patent: *Jan. 5, 2021

(54) METHOD AND SYSTEM FOR AUTOMATING PASSENGER SEAT ASSIGNMENT PROCEDURES

(71) Applicant: UNITED AIRLINES, INC., Chicago, IL (US)

(72) Inventors: Adam Lang, Chicago, IL (US); Russell Robert Grigg, Chicago, IL (US); Susan Wright-Mckeever, Chicago, IL (US)

(73) Assignee: UNITED AIRLINES, INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/209,224

(22) Filed: Dec. 4, 2018

(65) Prior Publication Data

US 2019/0108461 A1 Apr. 11, 2019

Related U.S. Application Data

(63) Continuation of application No. 14/632,181, filed on Feb. 26, 2015, now Pat. No. 10,185,920.

(51) Int. Cl.
*G06Q 10/02* (2012.01)
*G06Q 50/14* (2012.01)
*H04L 29/08* (2006.01)

(52) U.S. Cl.
CPC ............. *G06Q 10/02* (2013.01); *G06Q 50/14* (2013.01); *H04L 67/26* (2013.01)

(58) Field of Classification Search
None
See application file for complete search history.

(56) References Cited

U.S. PATENT DOCUMENTS 6,112,185 A 8/2000 Walker et al.
6,177,887 B1 * 1/2001 Jerome .............. G06Q 30/0621
725/76

(Continued)

OTHER PUBLICATIONS

"Announcing the ExpertFlyer Seat Alerts App for IPhone/IPad", retrieved from the Internet at: <http://blog.expertflyer.com/expertflyer/2012/07/announcing-the-expertflyer-seat-alerts-free-app-for-iphoneipad> (Jul. 31, 2012).

(Continued)

*Primary Examiner* — Fateh M Obaid
(74) *Attorney, Agent, or Firm* — Marshall, Gerstein & Borun LLP

(57) ABSTRACT

A method and system may provide automated passenger seat assignment procedures for an airline. A server device may determine passengers for a departing flight who are eligible to receive seat assignment notifications. When an eligible passenger is next in a standby or upgrade queue, the server device may transmit an electronic communication such as an email, short message service (SMS) message, push notification, etc., to the passenger's network-enabled device. The electronic communication may indicate that a seat assignment is available and may provide instructions for accepting or declining the available seat assignment. If the user accepts, for example, by transmitting an electronic reply message to the server device accepting the available seat assignment, the server device may transmit an electronic boarding pass to the user corresponding to the available seat assignment.

16 Claims, 12 Drawing Sheets

(56) References Cited

U.S. PATENT DOCUMENTS

| | | |
|---|---|---|
| 6,466,919 B1 | 10/2002 | Walker et al. |
| 7,848,940 B1 | 12/2010 | Harniman et al. |
| 8,082,165 B2 | 12/2011 | Natsuyama et al. |
| 8,185,426 B1 | 5/2012 | Khoubyari |
| 8,275,400 B2 | 9/2012 | Ergen et al. |
| 8,463,286 B2 | 6/2013 | Maranhas et al. |
| 8,718,615 B2 | 5/2014 | Ben-Alexander |
| 9,639,812 B1 | 5/2017 | Green et al. |
| 2004/0162755 A1* | 8/2004 | Muller ................ B64F 1/00 705/13 |
| 2006/0277079 A1 | 12/2006 | Gilligan et al. |
| 2007/0244731 A1 | 10/2007 | Barhydt et al. |
| 2007/0265890 A1* | 11/2007 | Curtis ................ G06Q 10/02 705/5 |
| 2007/0286220 A1 | 12/2007 | Stenning |
| 2008/0133283 A1 | 6/2008 | Backer et al. |
| 2009/0325606 A1 | 12/2009 | Farris |
| 2011/0082714 A1 | 4/2011 | Gaikwad |
| 2011/0307547 A1 | 12/2011 | Backer et al. |
| 2012/0004936 A1 | 1/2012 | Hamblett et al. |
| 2013/0035110 A1 | 2/2013 | Sridhara et al. |
| 2013/0045758 A1 | 2/2013 | Khorashadi et al. |
| 2015/0058148 A1 | 2/2015 | Grosz |
| 2015/0066546 A1 | 3/2015 | Scarborough et al. |
| 2016/0253599 A1 | 9/2016 | Lang et al. |

OTHER PUBLICATIONS

European Search Report, European patent application No. EP16157612, completed Jun. 27, 2016.

U.S. Office Action for U.S. Appl. No. 14/632,181, dated Oct. 12, 2017.

U.S. Office Action for U.S. Appl. No. 14/632,181, dated May 31, 2018.

* cited by examiner

METHOD AND SYSTEM FOR AUTOMATING PASSENGER SEAT ASSIGNMENT PROCEDURES

CROSS-REFERENCE TO RELATED APPLICATIONS

This application is a continuation of U.S. patent application Ser. No. 14/632,181, filed Feb. 26, 2015, entitled "Method and System for Automating Passenger Seat Assignment Procedures," the entire disclosure of which is hereby expressly incorporated by reference herein.

TECHNICAL FIELD

The present disclosure generally relates to automating passenger seat assignment procedures for an airline and, more particularly to automatically processing standby and/or upgrade passengers via a two-way messaging system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many airline passengers attempt to board a flight without a prior reservation to that specific flight (standby passengers). Also, often airline passengers will seek class upgrades on a flight, e.g., from business to first class (upgrade passengers). Airlines may place such passengers on standby or upgrade queues and manually offer seats or upgrades to such passengers based on their respective positions on the standby or upgrade queues when seats become available on a flight. Today this process is manual and requires a considerable amount of time of airline employees, to manage the standby and upgrade queues for each flight. Ideally, these employees would have more time to provide other valuable customer services to passengers.

BRIEF SUMMARY

When an eligible passenger is next in a standby or upgrade queue for a departing flight, a server device may transmit an electronic communication such as an email, short message service (SMS) message, push notification, etc., to the passenger's network-enabled device. The electronic communication may indicate that a seat assignment is available and may provide instructions for accepting or declining the available seat assignment. If the user accepts, for example, by transmitting an electronic reply message to the server device accepting the available seat assignment, the server device may transmit an electronic boarding pass to the user corresponding to the available seat assignment.

To automate passenger seat assignment procedures for a flight, a server device may obtain user contact information (also referred to herein as "travel contact data") and/or a preferred mode of communication from a user for transmitting messages related to seat assignments. For example, the server device may obtain the user contact information and preferred mode of communication when the user checks in for a departing flight using a mobile travel application or may retrieve the information from previously stored user contact information and a preferred mode of communication when the user made a flight reservation, or checked in to a previous flight. More specifically, the user may provide travel contact data (TCD), such as an email address, phone number, or login credentials/a flight reservation confirmation number for accessing the user's account in the mobile travel application. The user may also designate email, SMS message, or push notification as the preferred mode of communication for the travel contact data, when the user is a standby passenger or is seeking an upgrade and a seat assignment becomes available for the user to reserve.

When the user checks in for the departing flight, the server device may obtain standby and/or upgrade queues, which may place all standby passengers in a particular order in the standby queue based on priority, and all passengers seeking an upgrade in a particular order in the upgrade queue based on priority. For example, the standby and/or upgrade queues may be retrieved from a database (e.g., an airline computer reservation system (CRS) database such as a SHARES database) which includes seat assignment data for the departing flight. When the user's name comes up next in the standby queue for example, the server device automatically notifies the user using a predetermined communication mode. For example, the user may receive an email, SMS message, push notification, etc., generated by the server device, and indicating that a seat assignment is available and providing instructions for automatically accepting the seat assignment. In some embodiments, the message may also indicate an expiration period or an amount of time in which the user has to respond to the message (e.g., five minutes) before the message expires and the available seat assignment is offered to the next passenger in the queue.

If the user accepts the seat assignment, for example, by sending a reply SMS message with the word "Accept," the seat may be assigned to the user, and the user and the seat assignment may be removed from the standby queue. For example, the server device may communicate with an airline computer reservation system such as SHARES, Amadeus, Travelport, SABRE, etc., and provide instructions for the airline computer reservation system to assign the seat to the user and remove the user and the seat assignment from the standby queue. On the other hand, if the user declines, for example, by sending a reply SMS message with the word "Decline," the user may be removed from the standby queue, and the seat assignment may be offered to the next passenger in the queue. For example, the server device may communicate with the airline computer reservation system and provide instructions for the airline computer reservation system to assign the seat to remove the user from the standby queue. The server device may also generate and transmit a seat assignment message to the next passenger in the queue. Moreover, if the user does not respond within the expiration period, the seat assignment may be offered to the next passenger in the queue and the user may be placed in a different position in the standby queue based on the user's priority.

In this manner, airline employees may not have to participate in the seat assignment process for every departing flight reducing costs for the airline and allowing such employees to allocate their time to providing customer service. Moreover, the seat assignment process may become more accurate and may provide real-time information to passengers reducing the amount of confusion and congestion at the gate just before departure.

In some examples, the user may receive the accepted seat assignment by refreshing an electronic boarding pass in the mobile travel application, thereby eliminating the need for additional boarding card printing and reducing paper waste.

In some examples, the user receiving the upgrade is not issued a new boarding pass, but rather the server device communicates with the airline computer reservation system such as SHARES, Amadeus, Travelport, SABRE, etc. to associate the current boarding pass with the new seat assignment.

In an embodiment, a method for automating passenger seat assignment procedures for an airline is provided. The method includes obtaining user contact information for a user and a preferred electronic mode of communication for receiving the electronic communications. In response to receiving check-in information for a departing flight from the user, the method includes determining that a seat assignment is available on the departing flight and that the user is next in a queue of users, and transmitting, via the preferred electronic mode of communication, a seat assignment message to a user computing device when the user is next in the queue, indicating the seat assignment on the departing flight for the user and including one or more user controls or instructions for the user to accept or decline the seat assignment within a predetermined amount of time. The method further includes receiving, via the preferred mode of communication, an electronic response message to the seat assignment message from the user computing device within the predetermined amount of time indicating that the user accepts or declines the seat assignment, and updating stored indications of available seat assignments for the departing flight according to the electronic response by the user.

In another embodiment, a system for automating passenger seat assignment procedures for an airline is provided. The system includes a communication network, one or more processors coupled to the communication network, and one or more non-transitory computer readable memories coupled to the communication network and the one or more processors. The one or more memories include computer-executable instructions stored therein that. The instructions when executed by the one or more processors, cause the one or more processors to obtain user contact information for a user and a preferred electronic mode of communication for receiving the electronic communications. In response to receiving check-in information for a departing flight from the user, the instructions cause the one or more processors to determine that a seat assignment is available on the departing flight and that the user is next in a queue of users, and transmit, via the communication network and using the preferred electronic mode of communication, a seat assignment message to a user computing device when the user is next in the queue, indicating the seat assignment on the departing flight for the user and including one or more user controls or instructions for the user to accept or decline the seat assignment within a predetermined amount of time. The instructions further cause the one or more processors to receive, via the communication network and using the preferred electronic mode of communication, an electronic response message to the seat assignment message from the user computing device within the predetermined amount of time indicating that the user accepts or declines the seat assignment, and update stored indications of available seat assignments for the departing flight according to the electronic response by the user.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
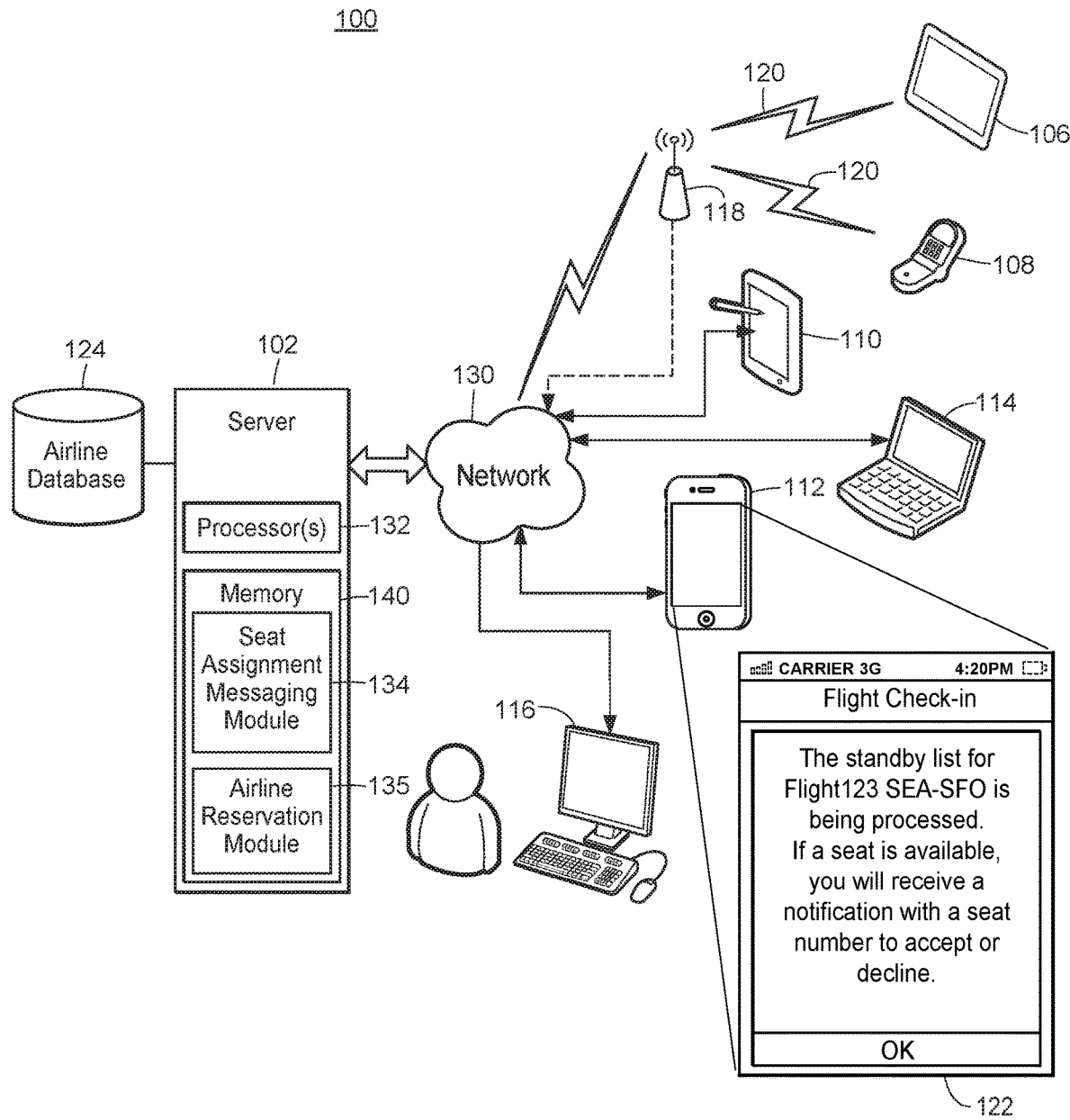
FIG. 1 illustrates a block diagram of a computer network and system on which an automated passenger seat assignment system may operate in accordance with an example aspect of the present disclosure.

Although the following text sets forth a detailed description of numerous different embodiments, it should be understood that the legal scope of the description is defined by the words of the claims set forth at the end of this patent and equivalents. The detailed description is to be construed as providing examples only and does not describe every possible embodiment since describing every possible embodiment would be impractical. Numerous alternative embodiments could be implemented, using either current technology or technology developed after the filing date of this patent, which would still fall within the scope of the claims.

Generally speaking, techniques for automating passenger seat assignments may be implemented in one or more network servers, one or more network-enabled devices, or a system that includes a combination of these devices. However, for example purposes, the examples below focus primarily on an embodiment in which a server device determines that a seat assignment is available on a departing flight and traverses a queue of passengers eligible to accept the available seat assignment. In some embodiments, a seat assignment messaging module included in the server device may interface with an airline reservation module included in the server device or in another service device, which stores seat assignment data and standby/upgrade queues for departing flights. In other embodiments, the server device may obtain seat assignment data and standby/upgrade queues from an airline database. In other examples, these queues are determined by the server device from the list of standby/upgrade users.

In any event, after determining or learning the preferred mode of communication, the server device generates and transmits an electronic message to a user's network-enabled device indicating that the seat assignment is available and/or providing instructions for responding to the electronic message. For example, the server device will identify the user on the standby/upgrade queue and identify a preferred mode of communication for sending electronic messages to the user. In some examples, that data is stored on an airline computer reservation system such as SHARES, Amadeus, Travelport, SABRE, etc., as a preset TCD communication mode. In some examples, the server device may communicate with a device (e.g., mobile smart phone) of the user and identify from that device, or more specifically from settings stored on that device, a preferred mode of communication.

Moreover, the server device may generate and transmit several electronic messages to several users' network-enabled devices, simultaneously. For example, if there are ten available seat assignments on a departing flight, the server device may transmit ten electronic messages to ten passengers each indicating that a different one of the ten seat assignments is available for the passenger to accept. The server device may determine whether to transmit seat assignment messages one at a time or in batches, and a number of batches for transmitting the seat assignment messages. The server device may determine the number of seat assignment messages to transmit simultaneously, based on several departing flight factors such as the seat assignment availability on the departing flight, the time remaining until the scheduled departure, weight restrictions on the departing flight, etc.

In any event, the network-enabled device may in turn respond to the electronic message with an electronic reply message indicating that the user of the network-enabled device accepts or declines the available seat assignment. In some examples, the server device may receive location data from the network-enabled device (e.g., via a global positioning system sensor), and determine the user's distance from the gate for the departing flight based on the location data. If the user is close to the gate, the server device may transmit additional electronic messages to the user's network-enabled device before offering the seat assignment to another passenger in the queue. In any event, the server device may update seat assignment availability and/or the standby/upgrade queues based on the received electronic reply message.

FIG. 1 illustrates various aspects of an example environment implementing an automated passenger seat assignment system 100. The environment may include a server device 102, and/or a plurality of network-enabled devices 106-116 which may be communicatively connected through a network 130, as described below. According to embodiments, the server device 102 may be a combination of hardware and software components, also as described in more detail below. The server device 102 may have an associated airline database 124 for storing flight information related to the operation of the automated passenger seat assignment system 100 such as available seat assignments on each departing flight, standby/upgrade queues of passengers for each departing flight, passenger priority information, weight restrictions on each departing flight, luggage restrictions, etc. Moreover, the server device 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a seat assignment messaging module 134 and an airline reservation module 135 (e.g., an airline computer reservation system such as SHARES, Amadeus, Travelport, SABRE, etc.). The server device 102 is described in more detail below with reference to FIG. 2A.

To automate passenger seat assignments, a seat assignment messaging module 134 may obtain indications of available seat assignments on a departing flight and/or a queue of standby/upgrade passengers eligible to receive the available seat assignments. For example, the indications of available seat assignments and queue of standby/upgrade passengers may be obtained from the airline reservation module 135, described in more detail below. In some embodiments, passengers who checked in for the departing flight and/or passengers who have not reserved a seat on the departing flight may be eligible. Furthermore, passengers seeking an upgrade to first class and/or passengers having certain priority may also be eligible to receive the available seat assignments.

The passengers may be placed in the standby/upgrade queue by the airline reservation module 135, or the seat assignment messaging module 134 may place the passengers in the standby/upgrade queue according to a set of rules and/or tiers based on for example, priority information for each passenger, the time at which each passenger checked in for the departing flight, each passenger's position in previous standby/upgrade queues for previous flights, etc. For example, the seat assignment messaging module 134 may place a user who has previously declined a seat assignment for the departing flight and who has premier platinum status, behind other users with premier platinum status in the queue, but ahead of users with premier silver status. In another example, the seat assignment messaging module 134 may place a first user ahead of a second user in the standby/upgrade queue when the first user and the second user check in at the same time for the departing flight, but the second user has been in higher positions relative to the first user in previous standby/upgrade queue for previous flights. The seat assignment messaging module 134 may also determine which eligible passengers provided user contact information for receiving automated seat assignment messages.

The seat assignment messaging module 134 may then determine if a passenger who provided user contact information (e.g., an email address, phone number, or login credentials/a flight reservation confirmation number for accessing the user's account in the mobile travel application) is next in the standby or upgrade queue. If the passenger is next in the standby or upgrade queue, the seat assignment message module 134 may generate and transmit an electronic message to the passenger's network-enabled device indicating that there is an available seat assignment on the departing flight and providing instructions for the passenger to accept the available seat assignment. In some embodiments, the electronic message may be transmitted to the phone number or email address that is provided when the passenger makes a flight reservation, checks in for the flight, or checked in for a previous flight. In other embodiments, the electronic message may be a push notification for a mobile application. The passenger may specify a preferred mode of communication for transmitting and/or receiving the electronic messages when the user checks in or any time before the electronic message is transmitted.

In any event, the seat assignment message module 134 may also receive an electronic reply message from the passenger's network-enabled device and may update the seat assignment data and/or upgrade/standby queues based on the passenger's reply (e.g., by communicating with the airline reservation module 135). If the passenger accepts the seat assignment, the electronic boarding pass on the passenger's mobile travel application may be refreshed and updated to indicate the new seat assignment. In some embodiments, an electronic message may be transmitted to a passenger who has already boarded the departing flight requesting that the passenger change to another seat assignment. The passenger may respond with an electronic reply message accepting the change and may move to the new seat assignment or may decline the change and remain in the original seat assignment.

In addition to transmitting electronic messages indicating available seat assignments to passengers one at a time, the seat assignment message module 134 may transmit several electronic messages to several passengers at the same time (or within a time interval of each other) in a batch process. For example, if there are ten available seat assignments on a departing flight, the seat assignment message module 134 may transmit ten electronic messages to ten passengers each indicating that a different one of the ten seat assignments is available for the passenger to accept. The seat assignment message module 134 may determine whether to transmit seat assignment messages one at a time or in batches, and a number of batches for transmitting the seat assignment messages. The amount of electronic messages transmitted by the seat assignment messaging module 134 may be based on several departing flight factors such as the seat assignment availability on the departing flight, the time remaining until the scheduled departure, weight restrictions on the departing flight, etc.

For example, if there is one hour remaining until the flight departs and ten available seat assignments, the seat assignment messaging module 134 may transmit electronic messages for five of the available seat assignments to five passengers in a standby queue. If all five passengers accept, the seat assignment messaging module 134 may transmit electronic messages for the other five available seat assignments to the next five passengers in the standby queue twenty minutes later. On the other hand if there is a half hour remaining until the flight departs and ten available seat assignments, the seat assignment messaging module 134 may transmit electronic messages for all ten of the available seat assignments to ten passengers in the standby queue. In another example, if there is a half hour remaining until the flight departs and ten available seat assignments but the departing flight has a weight restriction such that at least two seats must remain empty, the seat assignment messaging module 134 may transmit electronic messages for eight of the available seat assignments to eight passengers in the standby queue.

To obtain indications of available seat assignments on a departing flight and/or a queue of standby/upgrade passengers, the seat assignment messaging module 134 may communicate with an airline reservation module 135. The airline reservation module 135 may obtain indications of available seat assignments for several departing flights from an airline database 124. For each departing flight, the airline reservation module 135 may also obtain standby/upgrade queues from the airline database 124 or another database, and passenger name records (PNRs) which may contain an itinerary for each passenger or group of passengers on the departing flight.

The airline reservation module 135 may transmit the indications of available seat assignments and standby/upgrade queues for a departing flight to the seat assignment messaging module 134. In some embodiments, the seat assignment messaging module 134 may rank the indications of available seat assignments based on desirability (e.g. based on customer satisfaction reviews of each seat assignment on an aircraft, based on statistical data, etc.). For example, seats near the front of the plane may be more desirable and therefore ranked ahead of seats in the back of the plane, seats with more leg room may be more desirable than seats without extra leg room, seats by the window may be more desirable than middle seats, etc. In other embodiments, the seat assignment messaging module 134 may communicate with a seat assignment ranking module (not shown), which receives the indications of available seat assignments from the airline reservation module 135, ranks the available seat assignments, and communicates the rankings to the seat assignment messaging module 134. In any event, the seat assignment messaging module 134 may transmit the highest ranking available seat assignment to the next passenger in the standby/upgrade queue.

When passengers accept/decline the seat assignments or clear from standby/upgrade queues, the changes may be transmitted to the airline reservation module 135 and updated in the airline database 124. For example, if a standby passenger accepts seat 36C on Flight 4562 by sending an electronic reply message, the seat assignment message module 134 may transmit the updated seat assignment to the airline reservation module 135. The airline reservation module 135 may in turn, access the airline database 124 or another database and remove seat 36C from the indications of available seat assignments, remove the standby passenger from the standby queue, update the standby passenger's PNR, and assign the standby passenger to seat 36C. In this manner, when the standby passenger refreshes her electronic boarding pass on her mobile travel application, the airline reservation module 135 may generate and transmit an updated electronic boarding pass to her mobile device indicating that the standby passenger is assigned seat 36C for the departing flight. Additionally, the airline reservation module 135 may also generate, obtain and/or update other information for a departing flight such as weight restrictions on the departing flight, luggage restrictions, etc.

The network-enabled devices 106-116 may include, by way of example, a tablet computer 106, a cell phone 108, a personal digital assistant (PDA) 110, a mobile device smartphone 112 also referred to herein as a "mobile device," a laptop computer 114, a desktop computer 116, a portable media player (not shown), a home phone, a wearable computing device, smart glasses, smart watches, phablets, other smart devices, devices configured for wired or wireless RF (Radio Frequency) communication, etc. Of course, any network-enabled device appropriately configured may interact with the automated passenger seat assignment system 100. The network-enabled devices 106-116 need not necessarily communicate with the network 130 via a wired connection. In some instances, the network-enabled devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the network-enabled devices 106-116 may interact with the server device 102 to receive web pages and/or server data and may display the web pages and/or server data via a client application and/or an Internet browser (described below). For example, the mobile device 112 may display a standby notification screen 122 of the client application and/or a web page to a user, may receive an input from the user, and/or may interact with the server device 102 depending on the type of user-specified input. Based upon the client interactions with the server device 102, the server device 102 may generate and transmit messages indicative of an available seat assignment to a user, may transmit an electronic boarding pass including the available seat assignment to the user, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, etc. The multiple servers 102 may also include the seat assignment messaging module 134, the airline reservation module 135, and the seat assignment ranking module (not shown) as separate servers which may communicate with each other via the network 130.

The server device 102 may communicate with the network-enabled devices 106-116 via the network 130. The digital network 130 may be a proprietary network, a secure public Internet, a virtual private network and/or some other type of network, such as dedicated access lines, plain ordinary telephone lines, satellite links, a wireless telephony network, combinations of these, etc. Where the digital network 130 comprises the Internet, data communication may take place over the digital network 130 via an Internet communication protocol.

Figure 2A:
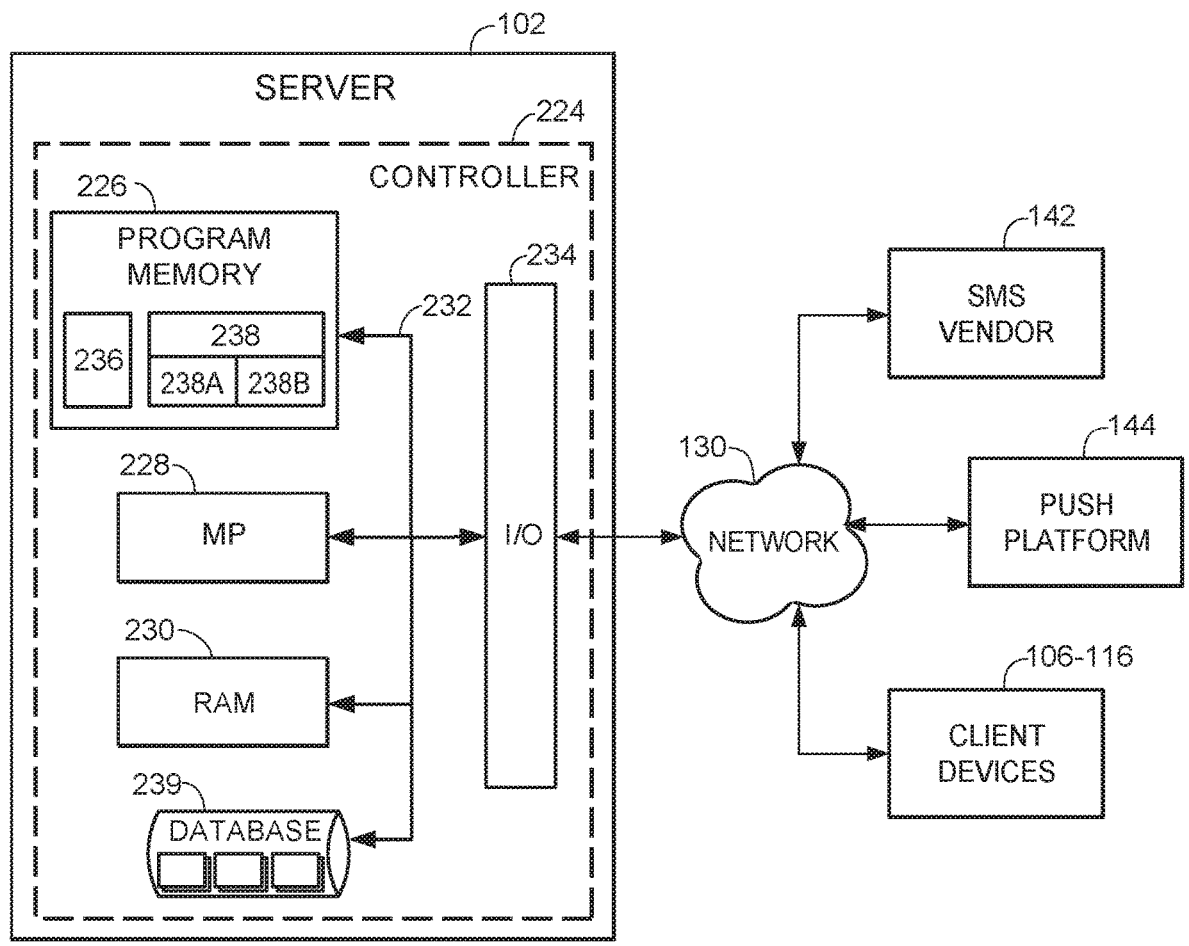
FIG. 2A illustrates a block diagram of an example server device in accordance with an example aspect of the present disclosure.

Turning now to FIG. 2A, the server device 102, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data for departing flights such as available seat assignments on each departing flight, standby/upgrade queues of passengers for each departing flight, PNRs, passenger priority information, etc., web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user interface application 236 may provide a user interface to the server device 102, which user interface may, for example, allow the system administrator to configure, troubleshoot, and/or test various aspects of the server's operation. A server application 238 may operate to generate and transmit seat assignment messages to the network-enabled devices 106-116. While the server application 238 may transmit/receive seat assignment messages directly to/from the network-enabled devices 106-116, in some embodiments, the server application 238 may transmit/receive SMS messages to/from an SMS vendor 142 which may transmit/receive the SMS messages to/from the network-enabled devices 106-116. Moreover, the server application 238 may transmit/receive push notifications to/from a push platform 144 which may transmit/receive the push notifications to/from the network-enabled devices 106-116. The server application 238 may be a single module 238 or a plurality of modules 238A, 238B.

While the server application 238 is depicted in FIG. 2A as including two modules, 238A and 238B, the server application 238 may include any number of modules accomplishing tasks related to implantation of the server device 102. By way of example, the module 238A may include the seat assignment messaging module 134, the module 238B may include the airline reservation module 135, and a module 238C (not shown) may include the seat assignment ranking module.

Figure 2B:
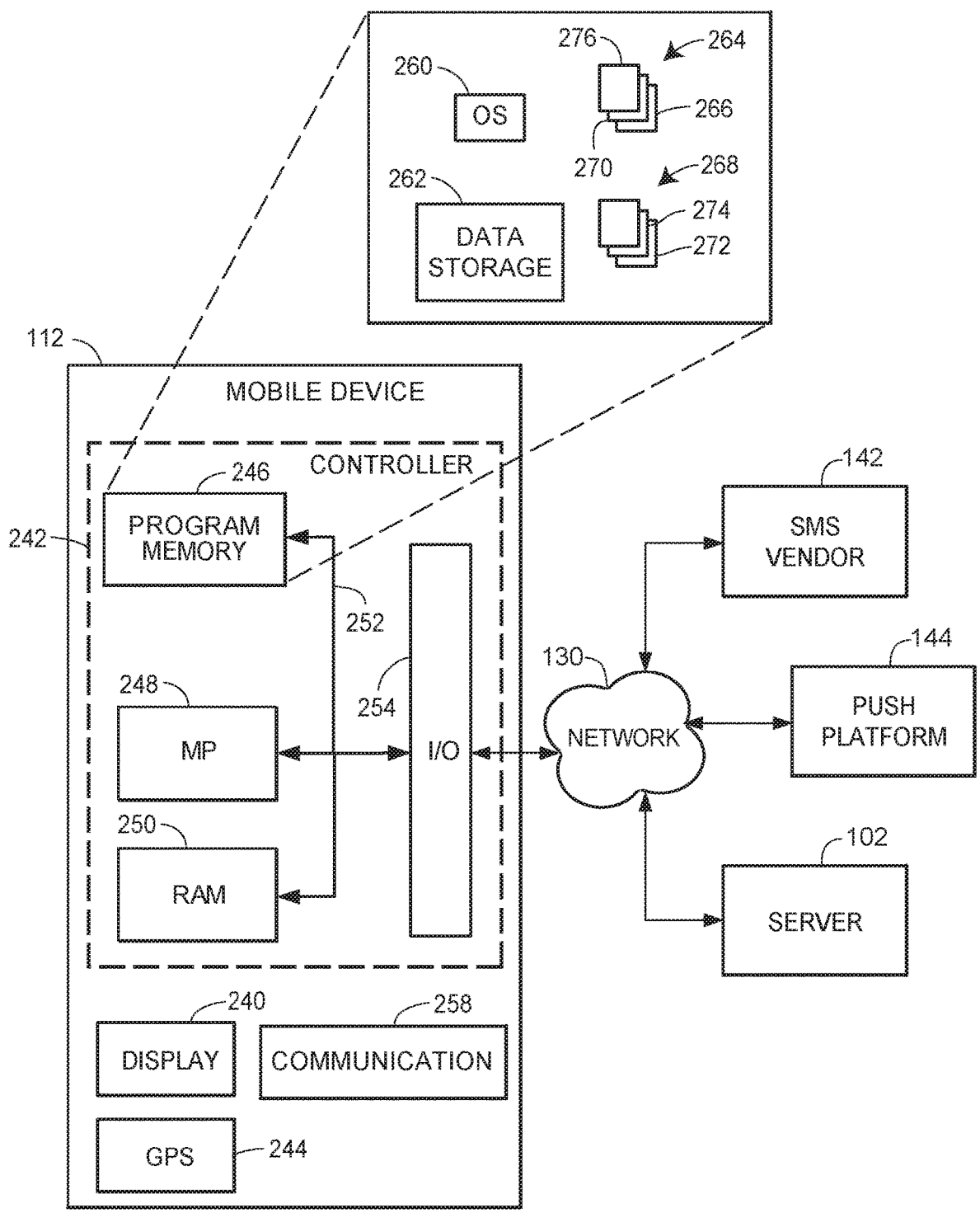
FIG. 2B illustrates a block diagram of an example network-enabled device in accordance with an example aspect of the present disclosure.

Referring now to FIG. 2B, the mobile device 112 (or any of the network-enabled devices 106-116) may include a global positioning system (GPS) sensor 244 for detecting the position of the mobile device 112, a display 240, a communication unit 258, a user-input device (not shown), and, like the server device 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and/or other data necessary to interact with the server device 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 112.

The communication unit 258 may communicate with the server device 102 via any suitable wireless communication protocol network, such as a wireless telephony network (e.g., GSM, CDMA, LTE, etc.), a Wi-Fi network (802.11 standards), a WiMAX network, a Bluetooth network, etc.

The GPS sensor 244 may use "Assisted GPS" (A-GPS), satellite GPS, or any other suitable global positioning protocol (e.g., the GLONASS system operated by the Russian government) or system that locates the position of the mobile device 112 (or any of the network-enabled devices 106-116). For example, A-GPS utilizes terrestrial cell phone towers or Wi-Fi hotspots (e.g., wireless router points) to more accurately and more quickly determine location of the mobile device 112, while satellite GPS generally is more useful in more remote regions that lack cell towers or Wi-Fi hotspots.

In some embodiments, if the server device 102 is permitted to receive location data from the user of the mobile device 112, the mobile device may transmit GPS sensor data indicative of the location of the mobile device 112 to the server device 102. The server device 102 may determine the distance from the mobile device 112 to the gate for the user's departing flight based on the GPS sensor data, which may be used for determining whether to send the user additional seat assignment messages before messaging the next passenger in the standby/upgrade queue.

The user-input device (not shown) may include a "soft" keyboard that is displayed on the display 240 of the mobile device 112, an external hardware keyboard communicating via a wired or a wireless connection (e.g., a Bluetooth keyboard), an external mouse, or any other suitable user-input device. As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 112.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server device 102 while also receiving inputs from the user. Another application of the plurality of applications may include an embedded web browser 276 that may be implemented as a series of machine-readable instructions for receiving, interpreting, and/or displaying web page information from the server device 102. One of the plurality of routines may include a seat acceptance routine 272 which receives an indication of an available seat assignment from the server device 102 and displays instructions for accepting the available seat assignment on the user interface 240. Another routine in the plurality of routines may include an open application routine 274 that receives user-input instructing the mobile device 112 to open an application which includes data stored on the server device 102 (e.g., a mobile travel application) and/or transmits a request for application data to the server device 102 in response to the user-input.

Preferably, a user may launch the client application 266 from a network-enabled device, such as one of the network-enabled devices 106-116, to communicate with the server device 102 to implement the automated passenger seat assignment system 100. Additionally, the user may also launch or instantiate any other suitable user interface application (e.g., the native application or web browser 270, or any other one of the plurality of software applications 264) to access the server device 102 to realize the automated passenger seat assignment system 100. Generally, while the term "user" in many instances may be used interchangeably with the term "passenger," in this specification, the term "user" is used when referring to a person who is operating a network-enabled device and is not exclusive of the term "passenger." For example, passengers operating network-enabled devices may be referred to as users.

In an embodiment, as shown in FIG. 2B, to access the server device 102, the user may execute the client application 266 on one of the network-enabled devices 106-116, such as the mobile device 112. Using the client application 266, the user may request server data (not shown) by navigating a series of client application screens, such as the standby notification screen 122 of the client application 266. FIGS. 3A-G depict client application pages and/or screens that the server device 102 may transmit in various embodiments of the automated passenger seat assignment system 100. However, the screens depicted in FIGS. 3A-G are merely illustrations of an example embodiment. In some scenarios, the server device 102 may transmit web pages. In other scenarios, for example, when the user does not designate push notification as her preferred mode of communication, the server device may transmit emails or SMS messages with the same or similar message content as the message content displayed in FIGS. 3A-G.

In any event, the user may launch the client application 266 from one of the network-enabled devices 106-116 via any suitable manner, such as touch-selecting a client application icon (not shown) on the display 240 of the mobile device 112, double-clicking on the client application icon via a mouse of a computer 116 and/or a trackpad (not shown) of a laptop 114. After the user launches the client application 266, a home page of the client application 266 may be displayed to the user on the mobile device 112.

The user may navigate the screens of the client application 266 to check in for a departing flight. In some embodiments, when the user checks in, she may be prompted to enter user contact information and select a preferred mode of communication. At the flight check-in page or any other suitable page of the client application 266, an automated seat assignment explanation screen may be displayed, such as the automated seat assignment explanation screen 300 shown in FIG. 3A. The screen 300 may include an automated seat assignment explanation message 302 explaining the automated seat assignment process. An "OK" button 304 may also be included which the user may select after reading the automated seat assignment explanation message 302. While the explanation message 302 indicates that the user is in the standby queue for Flight 123 from Seattle to San Francisco, this is merely for ease of illustration only and the user may be in an upgrade queue. Moreover, as mentioned above, while the explanation message 302 is included in the client application 266, the explanation message 302 may be an SMS message or an email, in which case the explanation message 302 may indicate that the user will receive information via SMS message or email, respectively.

Figure 3A:
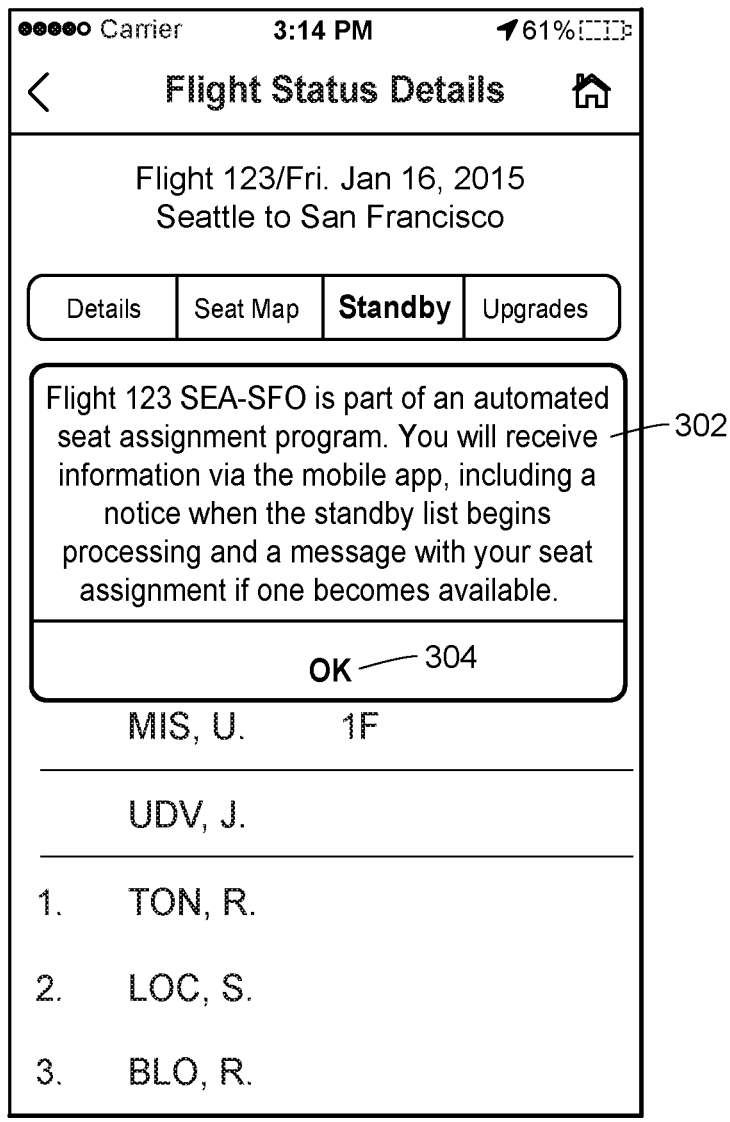
FIG. 3A illustrates an example automated seat assignment explanation screen of a client application in accordance with an example aspect of the present disclosure.
Figure 3B:
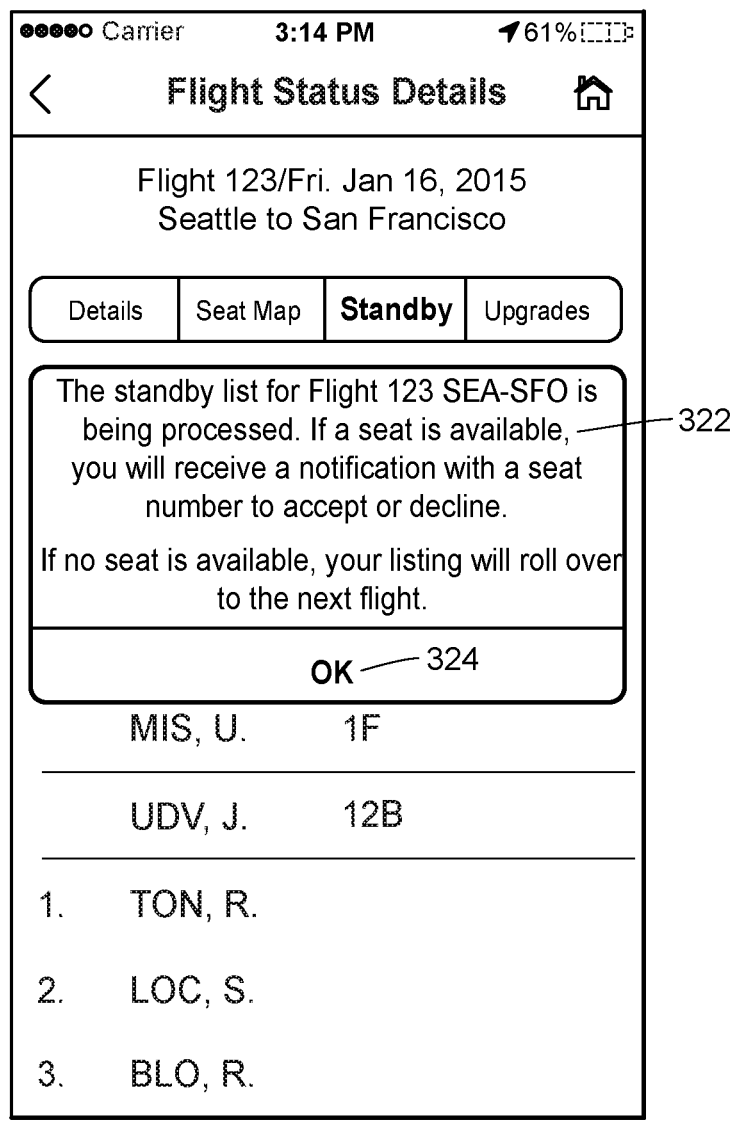
FIG. 3B illustrates an example standby notification screen of a client application in accordance with an example aspect of the present disclosure.

When the standby or upgrade queue for a departing flight begins processing, a standby notification screen may be displayed such as the standby notification screen as shown in FIG. 3B. The standby notification screen 320 may include a standby notification message 322 indicating that the standby queue is being processed and an "OK" button 324 which the user may select after reading the standby notification message 322. The standby notification message 322 may also indicate that the user may receive a notification of an available seat assignment which the user may accept or decline. If no seat is available or if the user declines the seat assignment, the user may be rescheduled to a later departing flight. Similar to the explanation message 302, while the standby notification message 322 indicates that the user is in the standby queue for Flight 123 from Seattle to San Francisco, this is merely for ease of illustration only and the user may be in an upgrade queue. Furthermore, while the standby notification message 322 is included in the client application 266, the standby notification message 322 may be an SMS message or an email, in which case the standby notification message 322 may indicate that the user will receive a message with a seat assignment to accept or decline via SMS message or email, respectively.

Figure 3C:
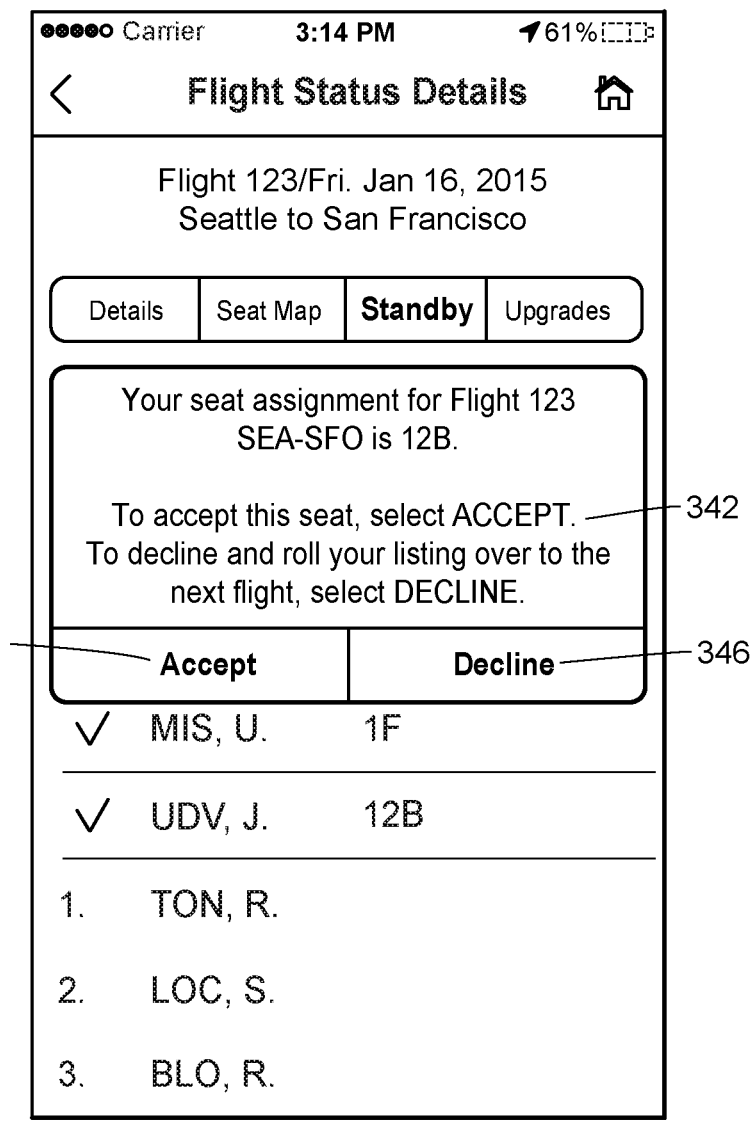
FIG. 3C illustrates an example seat assignment messaging screen of a client application in accordance with an example aspect of the present disclosure.

When the user is next in the standby/upgrade queue (or when the seat assignment messaging module sends a predetermined number of seat assignment messages and the user is within the predetermined number from the front of the standby/upgrade queue), the client application 266 may display a seat assignment messaging screen such as the seat assignment messaging screen 340 as shown in FIG. 3C. The seat assignment messaging screen 340 may include a seat assignment message 342 indicating that there is an available seat assignment on the departing flight for the user. User controls 344 and 346 for accepting/declining the available seat assignment may also be included such as an "ACCEPT" button 344 for accepting the available seat assignment and a "DECLINE" button for declining the available seat assignment.

The same seat assignment messaging screen 340 may be displayed on client applications for each user who belongs to a PNR. For example, if three users who are in the same family (e.g., a father, mother, and daughter) all belong to the same PNR, and there are three available seat assignments for the three passengers, each passenger may receive indications of the three available seat assignments on his or her respective network-enabled device.

In some embodiments, the seat assignment message 342 may also include an indication of an expiration period for responding to the seat assignment message 342. For example, the seat assignment message 342 may indicate that the user has five minutes to reply from the time the seat assignment message 342 is received. The user may also receive further notifications as the seat assignment message 342 reaches the expiration period. For example, the client application 266 may display a notification that the user has two minutes remaining to respond to the seat assignment message 342, that the user has one minute remaining to respond to the seat assignment message 342, etc.

Also in some embodiments, the location of the user's network enabled device may be determined to identify whether the user is within a predetermined threshold distance of the gate for the departing flight. For example, the user may permit the seat assignment messaging module 134 to receive location data for the user. The network-enabled device may then transmit location data to the server device 102 (e.g., via the GPS sensor 244) which may determine the user's distance from the gate based on the location data. In other embodiments, the network-enabled device's location may be determined using an indoor positioning system. For example, location beacons such as wireless access points, may be placed throughout an airport which may communicate with the network-enabled device through near field communication (NFC), radio-frequency identification (RFID), Wi-Fi networks, etc. The network-enabled device may determine distances between the location beacons, and using positioning techniques such as triangulation or trilateration, the location of the network-enabled device may be determined and transmitted to the server device 102. In some embodiments, the seat assignment messaging module 134 and/or the server device 102 may transmit a request to the network-enabled device for the location data, for example when the user has not responded to the seat assignment message 342 and the expiration period is at or near the end. In other embodiments, the network-enabled device may periodically transmit location data to the server device 102 with or without receiving a request for location data from the server device 102, for example from the time the user checks in for the departing flight until the departure time for the departing flight.

The client application 266 may then display additional electronic messages based on the user's location. For example, if the user is within the predetermined threshold distance of the gate at or near the end of the expiration period, the seat assignment messaging module 134 may transmit one more electronic message to be displayed on the client application 266 before moving on to the next passenger in the standby/upgrade queue. On the other hand, if the user is not within the predetermined threshold distance at or near the end of the expiration period, the seat assignment messaging module 134 may not transmit another electronic message, and may move on to the next passenger in the standby/upgrade queue at the end of the expiration period.

Similar to the explanation and standby notification messages 302 and 322, while the seat assignment message 342 indicates that the user will be rescheduled to the next departing flight if she declines the seat assignment because the user is presumably in the standby queue for Flight 123, this is merely for ease of illustration only and the user may be in an upgrade queue. If the user is in the upgrade queue, the seat assignment message 342 may not indicate that the user will be rescheduled to the next departing flight if she declines the seat assignment. Instead, the user may retain her original seat assignment for the departing flight. In other embodiments, the seat assignment message 342 may be transmitted to a passenger who has already boarded the departing flight requesting that the passenger change to another seat assignment. The passenger may respond by selecting the "ACCEPT" button 344 and may move to the new seat assignment or may decline the change by selecting the "DECLINE" button 346 and may remain in the original seat assignment.

Furthermore, while the seat assignment message 342 is included in the client application 266, the seat assignment message 342 may be an SMS message or an email, in which case the seat assignment message 342 may indicate that the user may accept/decline the seat assignment by sending a reply message via SMS message or email, respectively, with the letters/word/phrase "A," "ACC," "YES," "D," "DEC," "NO," or any other suitable letters/word/phrase which indicates that the user accepts or declines the seat assignment.

Figure 3D:
FIG. 3D illustrates an example accepted seat assignment screen of a client application in accordance with an example aspect of the present disclosure.

In any event, if the user accepts the seat assignment 12B on Flight 123, for example by selecting the "ACCEPT" button 344, the client application 266 may display an accepted seat assignment screen such as the accepted seat assignment screen 360 as shown in FIG. 3D. In some embodiments, when the user accepts the seat assignment 12B, the seat assignment messaging module 134 may transmit a request to the airline reservation module 135 to remove seat assignment 12B from the indications of available seat assignments for Flight 123, to assign the user to seat assignment 12B for Flight 123, to update the user's PNR, and to remove the user from the standby/upgrade queue. In any event, the accepted seat assignment screen 360 may include an accepted seat assignment message 362 indicating the user has accepted the seat assignment, the user's boarding group for the departing flight, and instructing the user to refresh the electronic boarding pass on the client application 266 to access the updated boarding pass which includes the accepted seat assignment. The accepted seat assignment screen 360 may also include an "OK" button 364 which the user may select after reading the accepted seat assignment message 362. While the accepted seat assignment message 362 is included in the client application 266, the accepted seat assignment message 362 may also be an SMS message or an email.

Figure 3E:
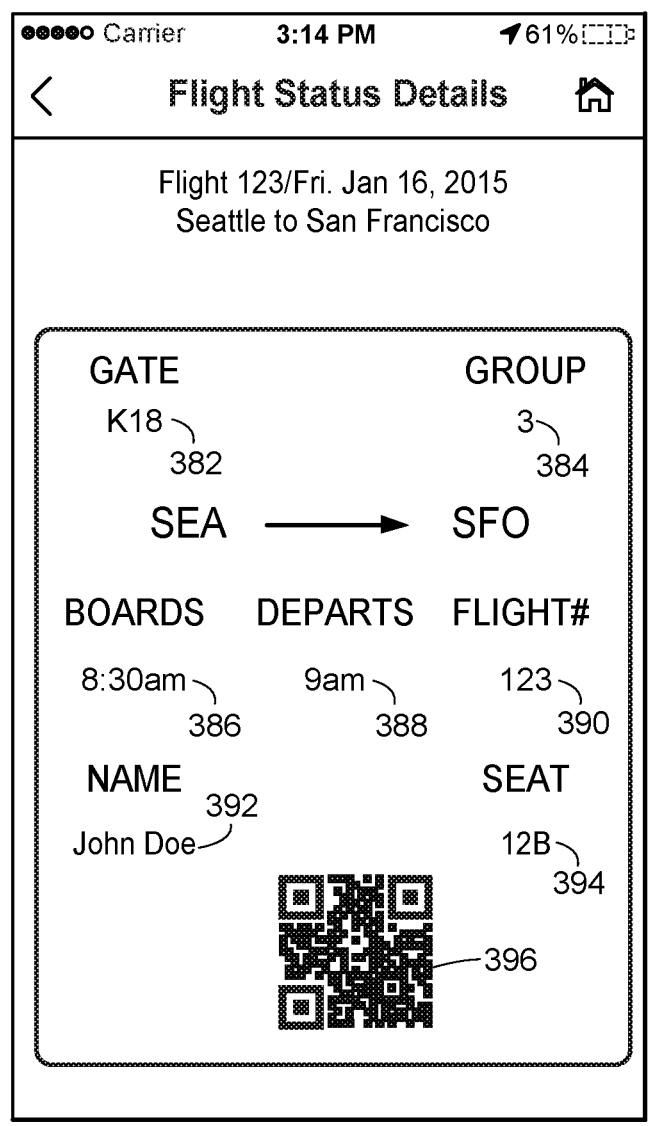
FIG. 3E illustrates an example electronic boarding pass screen of a client application in accordance with an example aspect of the present disclosure.

When the user refreshes her electronic boarding pass on the client application 266, an updated boarding pass may be displayed on an electronic boarding pass screen such as the electronic boarding pass screen 380 as shown in FIG. 3E. The electronic boarding pass screen 380 may include the gate for the departing flight 382, the user's boarding group for the departing flight 384, the departure and destination location of the departing flight, the boarding time for the departing flight 386, the departure time 388, and the flight number 390. The electronic boarding pass screen 380 may also include the name of the passenger 392, the updated seat assignment 394 which the user accepted, and a barcode 396 which may contain all of the flight and passenger information described above including the updated seat assignment 394. While the barcode 396 is displayed as a QR code, the barcode 396 may be any one or two dimensional barcode or any other suitable barcode.

Figure 3F:
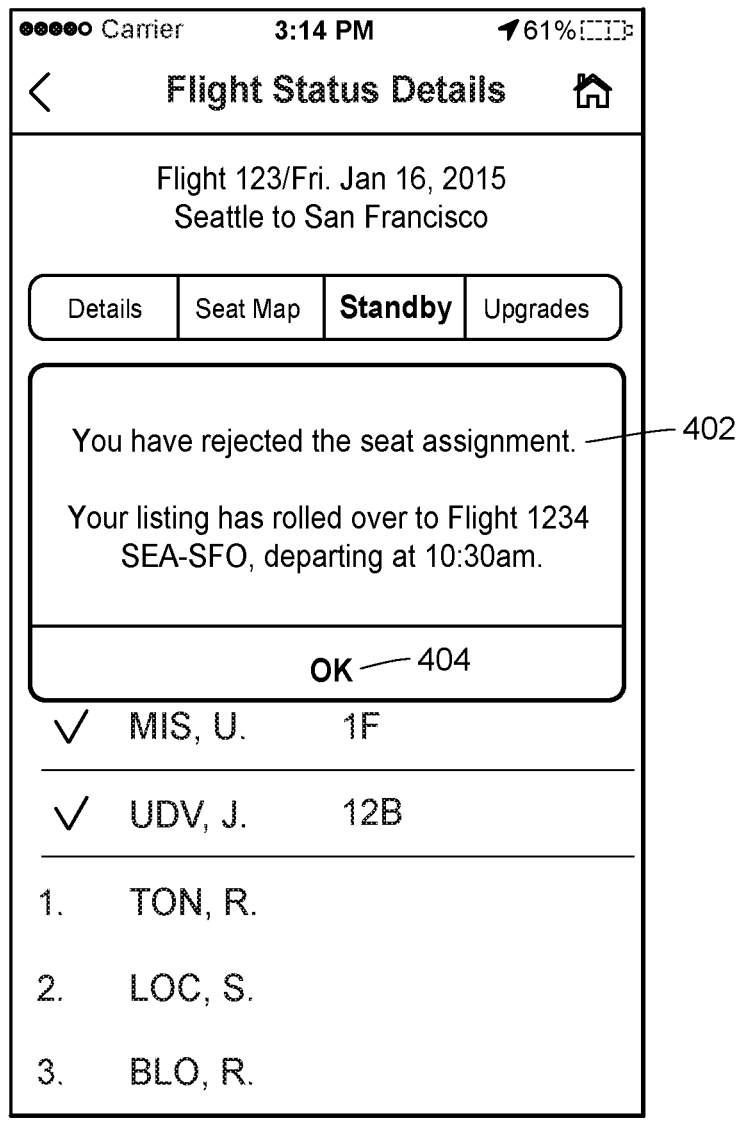
FIG. 3F illustrates an example declined seat assignment screen of a client application in accordance with an example aspect of the present disclosure.

If the user declines the seat assignment 12B on Flight 123, for example by selecting the "DECLINE" button 346, the client application 266 may display a declined seat assignment screen such as the declined seat assignment screen 400 as shown in FIG. 3F. In some embodiments, when the user declines the seat assignment 12B, the seat assignment messaging module 134 may transmit a request to the airline reservation module 135 to remove the user from the standby/upgrade queue for Flight 123, to update the user's PNR, and to place the user in the standby/upgrade queue for the next departing flight to the same destination as the original departing flight. In any event, the declined seat assignment screen 400 may include a declined seat assignment message 402 indicating that the user has rejected the seat assignment, and has been rescheduled from Flight 123 to Flight 1234. The declined seat assignment message 402 may also indicate that the departure time for Flight 1234 is at 10:30 a.m., ninety minutes after the departure time of 9 a.m. for Flight 123. In some embodiments, the seat assignment messaging module 134 may transmit a request to the airline reservation module 135 to place the user in the standby queue for Flight 1234. The user may then repeat the automated seat assignment process for Flight 1234. In any event, the declined seat assignment screen 400 may include an "OK" button 404 which the user may select after reading the declined seat assignment message 402. While the declined seat assignment message 402 is included in the client application 266, the declined seat assignment message 402 may also be an SMS message or an email.

Figure 3G:
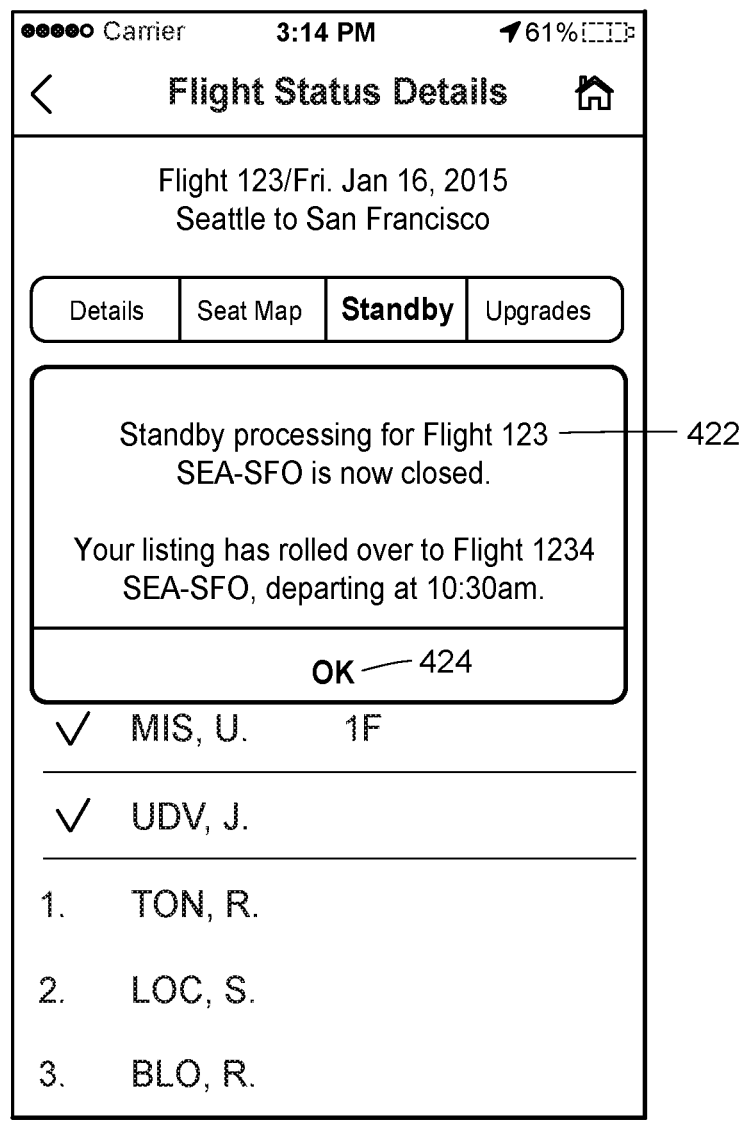
FIG. 3G illustrates an example flight reservation rescheduling screen of a client application in accordance with an example aspect of the present disclosure.

If there are no more available seat assignments on the departing flight before the user receives a seat assignment message such as the seat assignment message 342 as shown in FIG. 3C, the client application 266 may display a flight rescheduling screen such as the flight rescheduling screen 420 as shown in FIG. 3G. The flight rescheduling screen 420 may also be displayed if the user does not respond to the seat assignment message 342 within the indicated expiration period and is relocated to a different position in the standby queue. In this scenario, the user may be placed at the back of the queue and may not receive another electronic message until the rest of the standby passengers are cleared. In some scenarios, the user may still be placed ahead of some passengers according to priority. For example, a user with premier platinum status may be placed behind other users with premier platinum status in the queue, but ahead of users with premier silver status. However, if the user is relocated to a different position in the standby queue and if there are no more available seat assignments on the departing flight before the user receives another seat assignment message, the flight rescheduling screen 420 may be displayed to the user.

In some embodiments, when there are no more available seat assignments on the departing flight, the seat assignment messaging module 134 may transmit a request to the airline reservation module 135 to place the user in the standby queue for the next departing flight to the same destination as the original departing flight and to update the user's PNR. The user may then repeat the automated seat assignment process for the next departing flight. In any event, the flight rescheduling screen 420 may include a flight rescheduling message 422 indicating that there are no more available seat assignments on Flight 123, and that the user has been rescheduled from Flight 123 to Flight 1234. The flight rescheduling message 422 may also indicate that the departure time for Flight 1234 is at 10:30 a.m., ninety minutes after the departure time of 9 a.m. for Flight 123. In some embodiments, the seat assignment messaging module 134 may transmit a request to the airline reservation module 135 to place the user in the standby queue for Flight 1234. The user may then repeat the automated seat assignment process for Flight 1234. In any event, the flight rescheduling screen 420 may include an "OK" button 424 which the user may select after reading the flight rescheduling message 422. While the flight rescheduling message 422 is included in the client application 266, the flight rescheduling message 422 may also be an SMS message or an email.

Figure 4A:
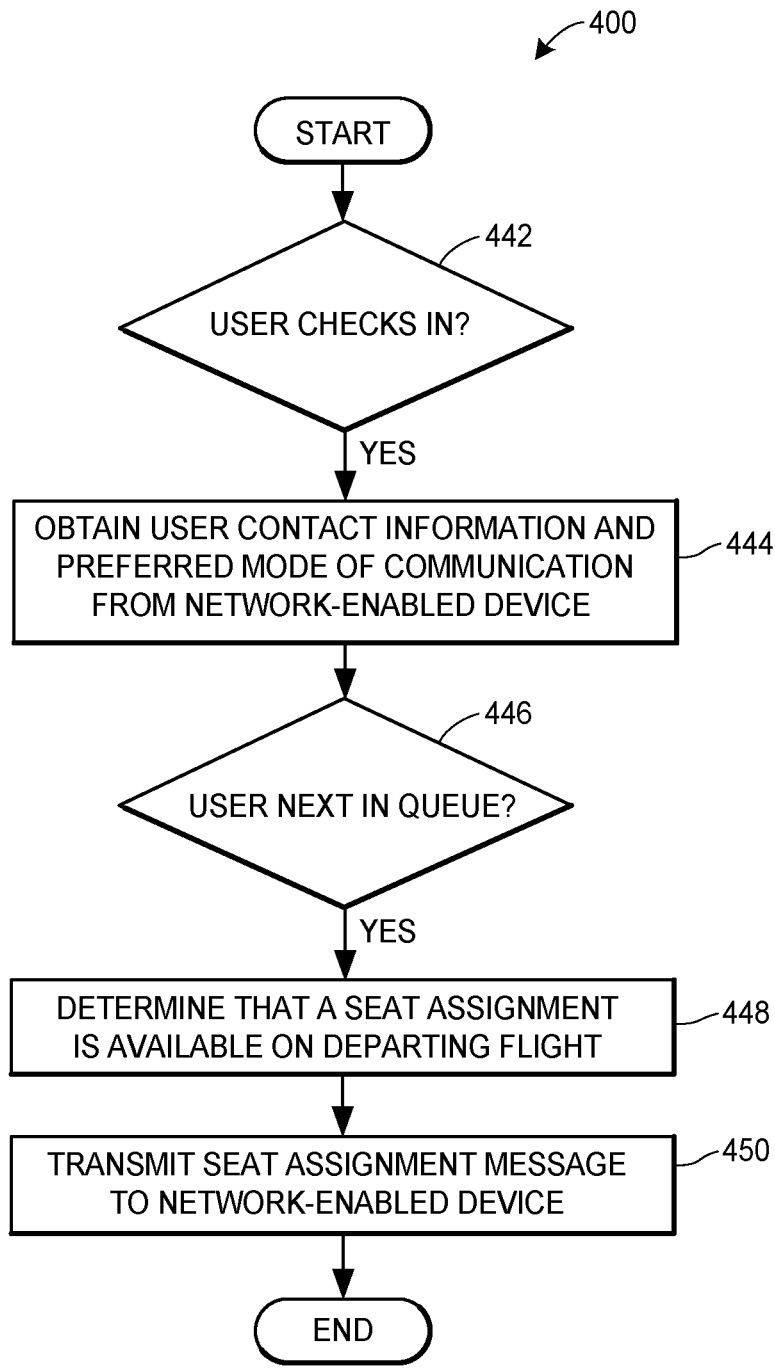
FIG. 4A depicts a flow diagram representing an example method for implementing the automated passenger seat assignment system in accordance with an example aspect of the present disclosure.

FIG. 4A illustrates a flow diagram representing an example method 440 for automating passenger seat assignment procedures for an airline. The method may be executed on the server device 102, one or more network-enabled devices 106-116, or some combination of the server device 102 and the one or more network-enabled devices. For example, at least a portion of the method 440 may be performed by the seat assignment messaging module 134 and/or the airline reservation module 135 which may be disposed within the server device 102. In an embodiment, the seat assignment messaging module 134 may include computer-executable instructions stored on one or more non-transitory, tangible, computer-readable storage media or devices, and the computer-executable instructions of the seat assignment messaging module 134 may be executed to perform the method 440.

At block 442, the seat assignment messaging module 134 may determine when the user checks in for a departing flight. The user may check in manually, may check in via a mobile application such as a mobile travel application or may check in via any other suitable manner. In some embodiments, the seat assignment messaging module 134 may receive an indication from the airline reservation module 135 indicating that the user has checked in for the departing flight. When the user checks in via the mobile travel application, the user may be prompted to enter user contact information (block 444) such as a phone number or an email address, or the seat assignment messaging module 134 may receive login credentials for the mobile travel application or a flight reservation confirmation number. The seat assignment messaging module 134 may also obtain a stored phone number or email address for the user from a previous check in for a departing flight, from when the user made the flight reservation or a previous flight reservation, etc. In any event, the user may also provide a preferred mode of communication for transmitting seat assignment messages such as email, SMS message, push notification or any other suitable form of electronic communication, or the seat assignment messaging module 134 may also obtain a stored preferred mode of communication for the user from a previous check in for a departing flight, from when the user made the flight reservation or a previous flight reservation, etc.

If the user has checked in and is eligible to receive indications of available seat assignments (e.g., the user is a standby passenger or is eligible for an upgrade), the user may be added to a standby or upgrade queue for the departing flight. When the user is next in the standby or upgrade queue (block 446), the seat assignment messaging module 134 may determine that a seat assignment is available on the departing flight (block 448) for example by communicating with the airline reservation module 135. In some embodiments, if multiple passengers are travelling together who belong to the same PNR (e.g., a father, mother, and daughter), the seat assignment messaging module 134 may determine whether there are enough available seat assignments on the departing flight for all of the passengers who belong to the same PNR to board the departing flight. In any event, an electronic message may be transmitted to the user's network-enabled device indicating that a seat assignment is available on the departing flight and providing instructions for the user to accept or decline the seat assignment (block 450).

In some embodiments, the seat assignment messaging module 134 may rank the indications of available seat assignments based on desirability (e.g. based on customer satisfaction reviews of each seat assignment on an aircraft, based on statistical data, etc.). For example, seats near the front of the plane may be more desirable and therefore ranked ahead of seats in the back of the plane, seats with more leg room may be more desirable than seats without extra leg room, seats by the window may be more desirable than middle seats, etc. In other embodiments, the seat assignment messaging module 134 may communicate with a seat assignment ranking module (not shown), which receives the indications of available seat assignments from the airline reservation module 135, ranks the available seat assignments, and communicates the rankings to the seat assignment messaging module 134. In any event, the seat assignment messaging module 134 may transmit the highest ranking available seat assignment to the next passenger in the standby/upgrade queue.

The electronic message may be transmitted from the seat assignment messaging module 134 directly to the user's network-enabled device, or may be transmitted to a messaging service provider such as an SMS vendor or a push platform, and then may be transmitted to the user's network-enabled device.

In some embodiments, the electronic message may include an expiration period in which the user can no longer accept the seat assignment (e.g., five minutes, ten minutes, thirty minutes, an hour, etc.). The seat assignment messaging module 134 may transmit multiple electronic messages to the user, where each electronic message includes an indication of an amount of time remaining until the end of the expiration period. For example, if the expiration period is ten minutes after the initial electronic message is sent, the user may also receive a second electronic message indicating that the user has five minutes left to respond, a third electronic message indicating that the user has two minutes left to respond, etc.

Moreover, in some embodiments, the seat assignment messaging module 134 may determine whether the user's network-enabled device is within a predetermined threshold distance of the gate for the departing flight. For example, the user may permit the seat assignment messaging module 134 to receive location data for the user. The network-enabled device may then transmit location data to the server device 102 (e.g., via the GPS sensor 244) which may determine the user's distance from the gate based on the location data. In other embodiments, the network-enabled device's location may be determined using an indoor positioning system. For example, location beacons such as wireless access points, may be placed throughout an airport which may communicate with the network-enabled device through near field communication (NFC), radio-frequency identification (RFID), Wi-Fi networks, etc. The network-enabled device may determine distances between the location beacons, and using positioning techniques such as triangulation or trilateration, the location of the network-enabled device may be determined and transmitted to the server device 102.

The seat assignment messaging module 134 may then transmit additional electronic messages to the user based on the user's location. For example, if the user is within a predetermined threshold distance of the gate at or near the end of the expiration period, the seat assignment messaging module 134 may transmit one more electronic message to the user before moving on to the next passenger in the standby/upgrade queue. On the other hand, if the user is not within the predetermined threshold distance at or near the end of the expiration period, the seat assignment messaging module 134 may not transmit another electronic message, and may move on to the next passenger in the standby/upgrade queue at the end of the expiration period.

Additionally, in some embodiments, after the user has boarded the departing flight, the seat assignment messaging module 134 may transmit an electronic message to the user's network-enabled device indicating that the user has been reassigned to a different seat assignment and providing instructions for the user to accept or decline the different seat assignment.

If there are no more available seat assignments on the departing flight, the seat assignment messaging module 134 may transmit a rescheduling message to the user's network-enabled device indicating that there are no seat assignments available on the departing flight and that the user has been rescheduled to a later departing flight. The seat assignment messaging module 134 may then communicate with the airline reservation module 135 to place the user in a standby queue for the later departing flight. When the user is next in the standby queue, the seat assignment messaging module 134 may determine that a seat assignment is available for the later departing flight, and may transmit an electronic message to the user's network-enabled device indicating that a seat assignment is available on the later departing flight and providing instructions for the user to accept or decline the seat assignment.

The electronic message may be sent to the user's phone number, email address, mobile travel application username, etc., based on the user's contact information and/or preferred mode of communication received via the mobile travel application and/or the airline reservation module 135. Moreover, the instructions for the user to accept or decline the seat assignment, may be instructions to send an SMS message to a particular phone number, and include the character "A" to accept the seat assignment or the character "D" to decline the seat assignment, for example. If the electronic message is a push notification for the mobile travel application, the user may accept or decline the seat assignment via one or more user controls on the mobile travel application.

Figure 4B:
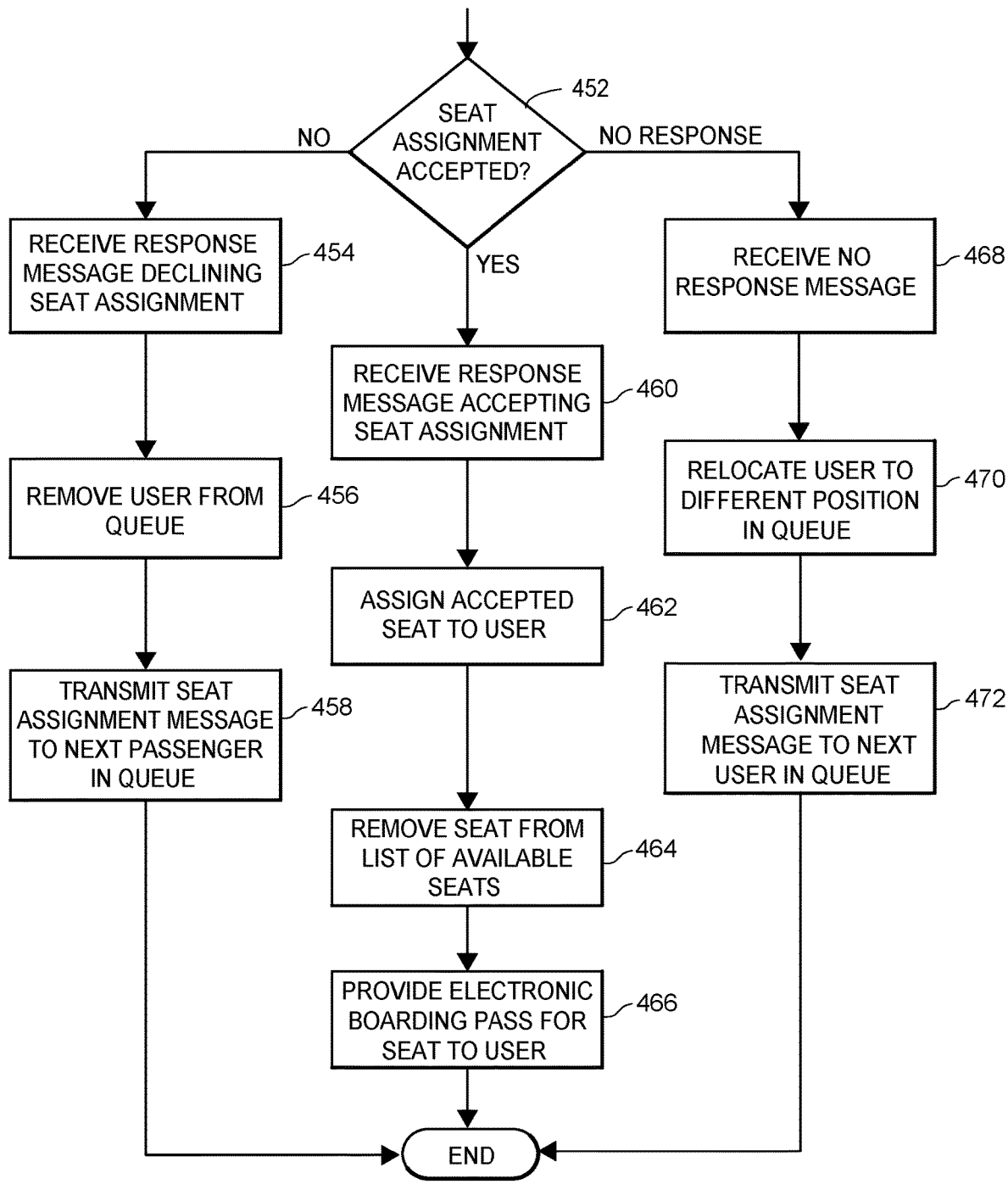
FIG. 4B depicts a continuation of the flow diagram of the example method for implementing the automated passenger seat assignment system.

Continuing on to FIG. 4B, if the user declines the seat assignment (block 454), for example, by sending an SMS message including the character "D," the user may be removed from the standby or upgrade queue that the user is in (block 456) such as by transmitting a request to the airline reservation module 135 to remove the user from the standby/upgrade queue. The seat assignment messaging module 134 may also transmit a rescheduling message to the user's network-enabled device indicating that the user has been rescheduled to a later departing flight. The seat assignment messaging module 134 may then communicate with the airline reservation module 135 to place the user in a standby queue for the later departing flight and to update the user's PNR. The seat assignment messaging module 134 may also transmit an electronic message to the next passenger in the queue (block 458). Moreover, if the user has already boarded the flight and declines a seat reassignment, the seat assignment messaging module 134 may cancel the seat reassignment. In some embodiments, if the next passenger has not provided contact information for receiving automated seat assignments, the passenger may manually be called up to the gate for the departing flight.

On the other hand, if the user accepts the seat assignment (block 460), for example, by sending an SMS message including the character "A," the available seat assignment may be assigned to the user (block 462) and removed from the indications of available seat assignments (block 464). In some embodiments, rather than printing a new boarding pass corresponding to the seat assignment, an electronic boarding pass may be transmitted to the user, for example, via the mobile travel application (block 466). If the user has already boarded the flight and accepts a seat reassignment, the user may move to the new seat assignment.

If the user does not respond to the electronic message before the end of the expiration period (e.g., five minutes, ten minutes, thirty minutes, an hour, etc.) (block 468), the user may be relocated to a different position in the standby or upgrade queue (block 470). The user may be placed at the back of the queue and may not receive another electronic message until the rest of the standby or upgrade passengers are cleared. In some scenarios, the user may still be placed ahead of some passengers according to priority. For example, a user with premier platinum status may be placed behind other users with premier platinum status in the queue, but ahead of users with premier silver status. In other embodiments, if the user does not respond before the end of the expiration period, the user may be manually called up to the gate for the departing flight.

The seat assignment messaging module 134 may then transmit an electronic message to the next passenger in the queue (block 472). In some embodiments, if the next passenger has not provided contact information for receiving automated seat assignments, the passenger may manually be called up to the gate for the departing flight.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as providing examples only and does not describe every possible embodiment, as describing every possible embodiment would be impractical, if not impossible. One could implement numerous alternate embodiments, using either current technology or technology developed after the filing date of this application.

We claim:

1. A method for automating passenger seat assignment procedures for an airline, the method comprising:
   determining, by one or more processors, that a seat assignment is available on a departing flight for a user;
   determining, by the one or more processors, a location of a user computing device of the user according to at least one of: (i) an indoor positioning system having a plurality of location beacons within an airport for the departing flight, one or more of the plurality of location beacons communicating with the user computing device, or (ii) a global positioning system communicating with a global positioning system sensor in the computing device to locate the user;
   determining, by the one or more processors, that the user computing device is within a predetermined threshold distance of a gate for the departing flight;
   in response to determining that the user computing device is within the predetermined threshold distance of the gate, transmitting, by the one or more processors, a seat assignment message to the user computing device indicating the seat assignment on the departing flight for the user and including one or more user controls or instructions for the user to accept or decline the seat assignment within a predetermined amount of time;

receiving, at the one or more processors, an electronic response message to the seat assignment message from the user computing device indicating that the user accepts or declines the seat assignment; and updating, by the one or more processors, stored indications of available seat assignments for the departing flight according to the electronic response by the user.

2. The method of claim 1, wherein a user is a plurality of users, wherein transmitting a seat assignment message to the user computing device includes transmitting a plurality of seat assignment messages to a plurality of user computing devices corresponding to the plurality of users and further comprising:

determining, by the one or more processors, an amount of seat assignment messages to transmit during a time interval based on at least one of: a number of available seat assignments on the departing flight, weight restrictions on the departing flight, or a time remaining until a scheduled departure time for the departing flight; and transmitting, by the one or more processors and during the time interval, at least some of the plurality of seat assignment messages corresponding to the determined amount to at least some of the plurality of users corresponding to the determined amount, wherein each of the at least some users is within the determined amount from a front of a queue of users.

3. The method of claim 1, wherein the electronic response message indicates that the user accepts the seat assignment, and further comprising:

assigning, by the one or more processors, the accepted seat assignment to the user;

removing, by the one or more processors, the accepted seat assignment from the stored indications of available seat assignments for the departing flight; and providing, by the one or more processors, an electronic boarding pass corresponding to the seat assignment to the user.

4. The method of claim 1, wherein the user is a first user and the electronic response message indicates that the first user declines the seat assignment, and further comprising:

removing, by the one or more processors, the first user from a queue of users; and transmitting, by the one or more processors, the seat assignment message to a second user computing device for a second user who is next in the queue.

5. The method of claim 1, wherein the user is a first user and the electronic response message is not received within the predetermined amount of time, and further comprising:

relocating, by the one or more processors, the first user to a different position in a queue of users; and transmitting, by the one or more processors, the seat assignment message to a second user computing device for a second user who is next in the queue.

6. The method of claim 5, wherein the queue of users includes a plurality of tiers within the queue, each tier corresponding to a priority level for users, and wherein relocating the first user to a different position in the queue comprises relocating, by the one or more processors, the first user to a last position within a tier of the plurality of tiers that corresponds to the first user.

7. The method of claim 1, further comprising:

in response to receiving check-in information for the departing flight from the user, transmitting, by the one or more processors, the seat assignment message to the user computing device including the one or more user controls or instructions for the user to accept or decline the seat assignment within the predetermined amount of time; and when the electronic response message is not received within the predetermined amount of time and in response to determining that the user computing device is within the predetermined threshold distance of the gate, transmitting, by the one or more processors, an additional seat assignment message to the user computing device.

8. The method of claim 1, further comprising:

determining, by the one or more processors, that there are no seat assignments available on the departing flight;

transmitting, by the one or more processors, a rescheduling message indicating that that there are no seat assignments available on the departing flight and the user has been rescheduled to a later departing flight;

entering, by the one or more processors, the user into a queue for the later departing flight;

determining, by the one or more processors, that a seat assignment is available on the later departing flight;

transmitting, by the one or more processors, a seat assignment message to the user computing device, indicating the seat assignment on the later departing flight for the user and including the one or more user controls or instructions for the user to accept or decline the seat assignment within the predetermined amount of time; and receiving, at the one or more processors, an electronic response message to the seat assignment message from the user computing device within the predetermined amount of time indicating that the user accepts or declines the seat assignment.

9. A system for automating passenger seat assignment procedures for an airline, the system comprising:

a communication network;

one or more processors coupled to the communication network; and one or more non-transitory computer readable memories coupled to the communication network and the one or more processors, wherein the one or more memories include computer-executable instructions stored therein that, when executed by the one or more processors, cause the one or more processors to:

determine that a seat assignment is available on a departing flight for a user;

determine a location of a user computing device of the user according to at least one of: (i) an indoor positioning system having a plurality of location beacons within an airport for the departing flight, one or more of the plurality of location beacons communicating with the user computing device, or (ii) a global positioning system communicating with a global positioning system sensor in the computing device to locate the user;

determine that the user computing device is within a predetermined threshold distance of a gate for the departing flight;

in response to determining that the user computing device is within the predetermined threshold distance of the gate, transmit, via the communication network, a seat assignment message to the user computing device indicating the seat assignment on the departing flight for the user and including one or more user controls or instructions for the user to accept or decline the seat assignment within a predetermined amount of time;

receive, via the communication network an electronic response message to the seat assignment message from the user computing device indicating that the user accepts or declines the seat assignment; and update stored indications of available seat assignments for the departing flight according to the electronic response by the user.

10. The system of claim 9, wherein a user is a plurality of users, wherein to transmit a seat assignment message to the user computing device the instructions cause the one or more processors to transmit a plurality of seat assignment messages to a plurality of user computing devices corresponding to the plurality of users and wherein the instructions further cause the one or more processors to:

determine an amount of seat assignment messages to transmit during a time interval based on at least one of: a number of available seat assignments on the departing flight, weight restrictions on the departing flight, or a time remaining until a scheduled departure time for the departing flight; and transmit, via the communication network and during the time interval, at least some of the plurality of seat assignment messages corresponding to the determined amount to at least some of the plurality of users corresponding to the determined amount, wherein each of the at least some users is within the determined amount from a front of a queue of users.

11. The system of claim 9, wherein the electronic response message indicates that the user accepts the seat assignment, and the instructions further cause the one or more processors to:

assign the accepted seat assignment to the user, remove the accepted seat assignment from the stored indications of available seat assignments for the departing flight, and provide an electronic boarding pass corresponding to the seat assignment to the user.

12. The system of claim 9, wherein the user is a first user and the electronic response message indicates that the first user declines the seat assignment, and the instructions further cause the one or more processors to:

remove the first user from a queue of users; and transmit the seat assignment message to a second user computing device for a second user who is next in the queue.

13. The system of claim 9, wherein the user is a first user and the electronic response message is not received within the predetermined amount of time, and the instructions further cause the one or more processors to:

relocate the first user to a different position in a queue of users; and transmit the seat assignment message to a second user computing device for a second user who is next in the queue.

14. The system of claim 13, wherein the queue of users includes a plurality of tiers within the queue, each tier corresponding to a priority level for users, and wherein to relocate the first user to a different position in the queue, the instructions cause the one or more processors to relocate the first user to a last position within a tier of the plurality of tiers that corresponds to the first user.

15. The system of claim 9, wherein the instructions further cause the one or more processors to:

in response to receiving check-in information for the departing flight from the user, transmit, via the communication network, the seat assignment message to the user computing device including the one or more user controls or instructions for the user to accept or decline the seat assignment within the predetermined amount of time; and when the electronic response message is not received within the predetermined amount of time and in response to determining that the user computing device is within the predetermined threshold distance of the gate, transmit, via the communication network, an additional seat assignment message to the user computing device.

16. The system of claim 9, wherein the instructions further cause the one or more processors to:

determine that there are no seat assignments available on the departing flight, transmit, via the communication network, a rescheduling message indicating that that there are no seat assignments available on the departing flight and the user has been rescheduled to a later departing flight;

enter the user into a queue for the later departing flight, determine that a seat assignment is available on the later departing flight, transmit, via the communication network, a seat assignment message to the user computing device, indicating the seat assignment on the later departing flight for the user and including the one or more user controls or instructions for the user to accept or decline the seat assignment within the predetermined amount of time, receive, via the communication network, an electronic response message to the seat assignment message from the user computing device within the predetermined amount of time indicating that the user accepts or declines the seat assignment.

* * * * *

UNITED STATES PATENT AND TRADEMARK OFFICE
CERTIFICATE OF CORRECTION

PATENT NO. : 10,885,475 B2  
APPLICATION NO. : 16/209224  
DATED : January 5, 2021  
INVENTOR(S) : Adam Lang et al.

Page 1 of 1

It is certified that error appears in the above-identified patent and that said Letters Patent is hereby corrected as shown below:

In the Claims

At Column 24, Line 15, "indicating that that" should be -- indicating that --.

At Column 26, Line 32, "indicating that that" should be -- indicating that --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*